UNITED STATES PATENT OFFICE

PAUL NAWIASKY, OF LUDWIGSHAFEN-ON-THE-RHINE, AND FILIP KAČER, OF MANNHEIM, GERMANY, ASSIGNORS TO GENERAL ANILINE WORKS, INC., OF NEW YORK, N. Y., A CORPORATION OF DELAWARE

PROCESS OF PREPARING DIPHTHALOYL-NAPHTHALENE COMPOUNDS AND A NEW PRODUCT OBTAINABLE THEREBY

No Drawing. Application filed January 20, 1931, Serial No. 510,058, and in Germany January 31, 1930.

The present invention relates to a process of preparing diphthaloyl-naphthalene compounds and to a new product obtainable thereby.

We have found that 1.2.5.6-diphthaloyl-naphthalene is obtainable by treating a 1.5-diaroyl-naphthalene-2.6-dicarboxylic acid, or a derivative thereof, of the following formula

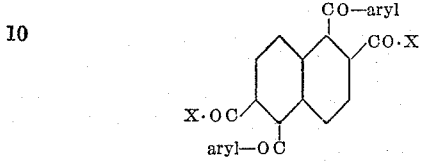

wherein X represents OH, Cl or Br, with an acid condensing agent. The dicarboxlic acids used as initial materials, may easily be obtained, for instance, according to the process of the application Ser. No. 501,675, filed December 11, 1930, in the name of Filip Kačer, by oxidizing 1.5-diaroyl-2.6-dimethylnaphthalene with selenious acid. In some cases, condensation already takes place by heating above the melting point; generally, however, it is preferable to use a condensing agent, such as aluminium chloride, sulfuric acid or phosphorus pentoxide or to first transform the 1.5-diaroyl-naphthalene-2.6-dicarboxylic acids into the corresponding chlorides and to convert the latter by heating in the presence or absence of a suitable condensing agent into the 1.2.5.6-diphthaloyl-naphthalenes.

The following examples serve to illustrate the invention, but they are not intended to limit it thereto; the parts are by weight:

(1) 3 parts of 1.5-dibenzoyl-2.6-naphthalene-dicarboxylic acid, melting at 324° C.–326° C., are stirred together with 6 parts of phosphorus pentoxide and 30 parts of nitrobenzene for 4 hours at 110° C.–120° C. Thereupon, the whole is diluted with water and the nitrobenzene is removed by steam-distillation. The residue is then boiled with dilute caustic soda solution in order to separate the unaltered parent material, dried and, if necessary, re-crystallized from trichlorbenzene. The diphthaloylnaphthalene is obtained in the form of shining small yellow crystals, melting at about 428° C.

(2) At 135° C., 2 parts of the starting material, used in Example 1, are introduced into a melt consisting of 13.1 parts of aluminium chloride and 15.8 parts of sodium chloride and the whole is stirred for 2 hours at 140° C.–145° C. Thereupon, the reaction mixture is decomposed with water and extracted by boiling first with hydrochloric acid and then with dilute caustic soda solution. The 1.2.5.6-diphthaloylnaphthalene, thus obtained in a rather pure state, may further be purified as described in Example 1.

(3) 46 parts of 1.5-dibenzoyl-2.6-naphthalene-dicarboxylic acid chloride, melting at 293° C.–295° C., obtained by boiling dicarboxylic acid with thionyl-chloride, are heated to gentle boiling with 500 parts of nitrobenzene and 40 parts of aluminium chloride, until the evolution of hydrochloric acid decreases. The 1.2.5.6-diphthaloylnaphthalene begins to separate even in the heat. After the reaction is finished, the whole is allowed to cool, filtered by suction; the solid matter is washed with nitrobenzene and alcohol. The reaction mixture may also be freed from the solvent by steam distillation and the residue may be washed with water. The crude product, thus obtained, corresponds practically with that obtained according to Examples 1 and 2.

(4) 1.5-dibenzoylnaphthalene-2.6-dicarboxylic acid chloride is heated to about 330° C.–340° C., until the evolution of hydrochloric acid decreases. The yellow melt, thus obtained, is the crude 1.2.5.6-diphthaloyl-naphthalene, which may be obtained in a pure state by re-crystallization from an organic agent.

(5) 20 parts of 1.5-dibenzoylnaphthalene-2.6-dicarboxylic acid are heated with 300 parts of sulfuric acid of 66° Bé. to about 160° C. The whole dissolves at first and, at about 160° C., yellow crystals precipitate. This temperature is maintained for some time and, thereupon, the whole is allowed to cool. The product is filtered by suction, washed with sulfuric acid and water and dried. The 1.2.5.6-diphthaloylnaphthalene, thus formed, is obtained in a chemically pure state.

(6) By using in the preceding example, instead of 1.5-dibenzoylnaphthalene-2.6-dicarboxylic acid, 1.5-di-(orthochlorbenzoyl-)naphthalene-2.6-dicarboxylic acid or 1.5-di-(para-chlorbenzoyl-)naphthalene-2.6-dicarboxylic acid, the corresponding dichloro-1.2.5.6-diphthaloyl-naphthalenes are obtained in a chemically pure state. The product obtained when using 1.5-di-(orthochlorobenzoyl-)naphthalene-2.6-dicarboxylic acid corresponds with the following formula

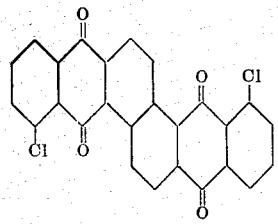

It forms in the pure state shining yellow small crystals, dissolving in sulfuric acid to an orange-yellow solution and yielding an olive-brown hydrosulfite vat.

We claim:

1. The process which comprises heating a compound of the general formula:

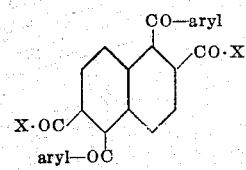

wherein X represents OH, Cl or Br in the presence of an acid condensing agent.

2. The process which comprises heating a compound of the general formula:

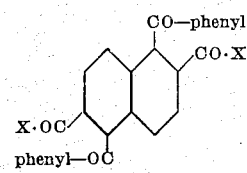

wherein X represents OH, Cl or Br in the presence of an acid condensing agent.

3. The process which comprises heating a compound of the following formula:

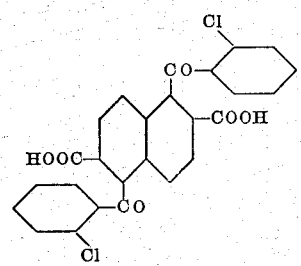

in the presence of concentrated sulfuric acid at a temperature of about 160° C.

4. As a new product, the compound of the following formula:

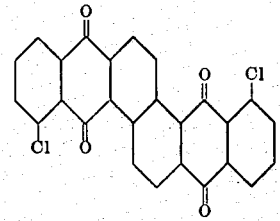

forming in the pure state shining yellow small crystals which dissolve in sulfuric acid to an orange-yellow solution and yield an olive-brown hydrosulfite vat.

In testimony whereof, we affix our signatures.

PAUL NAWIASKY.
FILIP KAČER.